(12) United States Patent
Yu et al.

(10) Patent No.: US 10,814,359 B2
(45) Date of Patent: Oct. 27, 2020

(54) CLEANING MECHANISM, CLEANING DEVICE AND AIR CONDITIONER

(71) Applicant: Gree Electric Appliances, Inc. of Zhuhai, Zhuhai (CN)

(72) Inventors: Jiebin Yu, Zhuhai (CN); Zhihui Liang, Zhuhai (CN)

(73) Assignee: Gree Electric Appliances, Inc. of Zhuhai, Zhuhai (CN)

( * ) Notice: Subject to any disclaimer, the term of this patent is extended or adjusted under 35 U.S.C. 154(b) by 259 days.

(21) Appl. No.: 15/579,395

(22) PCT Filed: Aug. 9, 2016

(86) PCT No.: PCT/CN2016/094155
§ 371 (c)(1),
(2) Date: Dec. 4, 2017

(87) PCT Pub. No.: WO2017/028710
PCT Pub. Date: Feb. 23, 2017

(65) Prior Publication Data
US 2018/0178260 A1    Jun. 28, 2018

(30) Foreign Application Priority Data
Aug. 14, 2015 (CN) .......................... 2015 1 0500300

(51) Int. Cl.
*B01D 46/00* (2006.01)
*B08B 5/04* (2006.01)
(Continued)

(52) U.S. Cl.
CPC ............ *B08B 5/04* (2013.01); *B01D 46/0065* (2013.01); *B08B 1/002* (2013.01); *B08B 1/008* (2013.01);
(Continued)

(58) Field of Classification Search
CPC ....... A47L 9/02–08; A47L 9/106; B08B 5/04; B08B 1/002; B08B 1/008; B01D 46/00;
(Continued)

(56) References Cited

U.S. PATENT DOCUMENTS 3,971,091 A * 7/1976 Peren ........................ A01K 1/01
15/49.1
2007/0095027 A1* 5/2007 Liva ........................ B01D 46/10
55/301
(Continued)

FOREIGN PATENT DOCUMENTS

CN          2901143 Y      5/2007
CN        101057111 A     10/2007
(Continued)

*Primary Examiner* — T. Bennett McKenzie
(74) *Attorney, Agent, or Firm* — The Webb Law Firm

(57) ABSTRACT

A cleaning mechanism, a cleaning device, and an air conditioner are disclosed. The cleaning mechanism is configured to remove dust of an member object to be cleaned, and includes a dust suction member and a switch member. The dust suction member is movable in a reciprocating manner with respect to a surface to be cleaned of the object, and is provided with at least two separate dust suction chambers each having a dust suction port. In an extension direction of the dust suction chambers, a projected length of the dust suction port on the surface to be cleaned is smaller than the length of the surface to be cleaned. Each of the dust suction chambers is configured to communicate with a fan, and the switch member selectively communicates the fan with one of the dust suction chambers.

10 Claims, 2 Drawing Sheets

(51) Int. Cl.
*F24F 13/28* (2006.01)
*B08B 1/00* (2006.01)
*B01D 46/10* (2006.01)
*A47L 9/10* (2006.01)
*A47L 9/02* (2006.01)

(52) U.S. Cl.
CPC .............. *F24F 13/28* (2013.01); *A47L 9/02* (2013.01); *A47L 9/106* (2013.01); *B01D 46/10* (2013.01); *B01D 2279/50* (2013.01); *F24F 2221/22* (2013.01)

(58) Field of Classification Search
CPC ........... B01D 46/0065; B01D 46/10; B01D 2279/50; F24F 13/28; F24F 2221/22
USPC .................................................. 55/295–300
See application file for complete search history.

(56) References Cited

U.S. PATENT DOCUMENTS

| | | | | |
|---|---|---|---|---|
| 2008/0011440 | A1* | 1/2008 | Rajanummi | B01D 46/0065 162/272 |
| 2008/0028570 | A1* | 2/2008 | Cascio | A47L 5/30 15/351 |
| 2011/0191978 | A1* | 8/2011 | Yoo | A47L 5/32 15/347 |
| 2012/0216362 | A1* | 8/2012 | Cunningham | A47L 5/12 15/301 |

FOREIGN PATENT DOCUMENTS

| | | |
|---|---|---|
| CN | 200968694 Y | 10/2007 |
| CN | 101099910 A | 1/2008 |
| CN | 105057283 A | 11/2015 |
| CN | 105170569 A | 12/2015 |
| CN | 204866727 U | 12/2015 |
| CN | 204866728 U | 12/2015 |
| JP | S4949267 A | 5/1974 |
| JP | S5270798 U | 6/1977 |
| JP | S53165567 U | 12/1978 |
| JP | 2004263984 A | 9/2004 |
| JP | 2004283703 A | 10/2004 |
| JP | 2004286345 A | 10/2004 |
| JP | 2006322682 A | 11/2006 |
| JP | 2007025169 A | 3/2007 |
| WO | 2006051740 A1 | 5/2006 |

\* cited by examiner

CLEANING MECHANISM, CLEANING DEVICE AND AIR CONDITIONER

CROSS-REFERENCE TO RELATED APPLICATIONS

This application is the United States national phase of International Application No. PCT/CN2016/094155 filed Aug. 9, 2016, and claims priority to Chinese Patent Application No. 201510500300.0 filed Aug. 14, 2015, the disclosures of which are hereby incorporated in their entirety by reference.

FIELD OF THE INVENTION

The present disclosure relates to dust removal technology, and more particularly to a cleaning mechanism, a cleaning device, and an air conditioner.

BACKGROUND OF THE INVENTION

In the existing indoor unit of an air conditioner, an air filter for preventing intrusion of dust into the body is generally provided in front of the heat exchanger and detachably mounted on the filter frame so as to be freely detachable and cleaned to remove the dusts attached to the surface.

In the prior art, there is also an automatic cleaning device capable of automatically removing the dust attached to the air filter with no need for the air filter to be detached from the filter frame, but said device is complex in structure, poor in working stability, and high in manufacturing costs of parts; further, it has harsh requirement for working environment, is poor in overall reliability, and has a cleaning effect difficult to guarantee.

In the prior art, there is also an air conditioner with a function of automatically cleaning the air filter, in which a drive shaft connected to a drive source, a worm wheel slidably mounted on the drive shaft and sliding together with a suction nozzle, and a rack engaged with the worm wheel combine to constitute a drive mechanism for driving the suction nozzle, and the dust at the suction nozzle is sucked through an exhaust fan. The suction nozzle is formed into a film-like belt having a predetermined width. As the area of the film-like belt is relatively large, the air filter has a great demand for the suction force of the fan, and the dust removing effect is difficult to ensure. If the output power of the fan is increased in order to improve the dust removal effect, the motor for driving the fan will be increased in size, which will increase the overall size of the air filter and accordingly cannot meet the miniaturization requirement of the air filter.

SUMMARY OF THE INVENTION

An object of the present disclosure is to provide a cleaning mechanism, a cleaning device and an air conditioner, in order to improve the dust removal effect of the cleaning mechanism for an object to be cleaned.

For this purpose, the present disclosure provides a cleaning mechanism for removing dust of an object to be cleaned, comprising a dust suction member and a switch member, wherein the dust suction member is movable in a reciprocating manner with respect to a surface to be cleaned of the object, and the dust suction member is provided with at least two separate dust suction chambers, each dust suction chamber having a dust suction port; in an extension direction of the dust suction chamber, a projection length of the dust suction port on the surface to be cleaned is smaller than the length of the surface to be cleaned; each of the dust suction chambers for communicating with a fan, and the switch member is selectively communicate the fan with one of the dust suction chambers.

Further, the switch member is provided at an outlet of the dust suction chambers between the dust suction chambers and the fan.

Further, the switch member comprises a drive unit and a rotation unit, the rotation unit is provided with a through hole and rotates under the driving action of the drive unit, and a circumferential position of the through hole changes with rotation of the rotation unit, so as to selectively communicate the fan with one of the dust suction chambers.

Further, the dust suction member is configured as a bracket across the surface to be cleaned, the dust suction chambers are provided in the bracket, and the bracket performs reciprocating movement by cooperation of rollers arranged at two ends of the bracket and slide rails arranged on both sides of the surface to be cleaned.

Further, the dust suction ports on the dust suction member are arranged in a direction perpendicular to the direction of movement of the dust suction member.

Further, in the direction perpendicular to the direction of movement of the dust suction member, the dust suction ports overlap each other, so as to fully cover the surface to be cleaned during the movement of the dust suction member.

Further, a surface of bent portions on an inner wall of the dust suction chambers is configured to be tangent to a flow direction of dust suction air through the bent portions.

Further, a transition surface at the first connection between the switch member and the outlet of the dust suction chamber is configured to be tangent to a flow direction of dust suction air through the first connection, and a transition surface at the second connection between the switch member and the fan is configured to be tangent to a flow direction of dust suction air through the second connection.

Further, on a side of the bracket adjacent to the surface to be cleaned is provided with a brush for cleaning dust on the surface to be cleaned.

In order to achieve the above-mentioned objects, the present disclosure further provides a cleaning device comprising a drive mechanism and the aforementioned cleaning mechanism, the drive mechanism for driving the dust suction member to perform reciprocating movement with respect to the surface to be cleaned.

Further, the drive mechanism comprises a helical gear and a helical rack, and the reciprocating movement of the dust suction member with respect to the surface to be cleaned is caused by engagement of the helical gear and the helical rack.

In order to achieve the above-mentioned objects, the present disclosure further provides an air conditioner comprising the aforementioned cleaning mechanism or the aforementioned cleaning device, the object to be cleaned is a filter screen of the air conditioner.

Further, the surface to be cleaned includes a surface of the filter screen provided on two adjacent surfaces of the air conditioner, and the switch member and the drive mechanism are provided on an intersection between the two adjacent surfaces so as to be able to clean the surface of said filter screen on at least one of said two adjacent surfaces.

Based on the above technical solution, by arrangement of a dust suction member and a switch member, in which the dust suction member is provided with at least two separate dust suction chambers, the cleaning mechanism can switch communication between the fan and different dust suction chambers by said switch member, and in the extension direction of the dust suction chambers, the projection length of the dust suction ports in the dust suction chambers on the surface to be cleaned is smaller than the length of the surface to be cleaned, a cleaning process of the cleaning mechanism for the surface to be cleaned can be performed by regions, and an area of the dust suction ports working in the same period is reduced, thereby achieving a better dust removal effect in case of the same fan power.

BRIEF DESCRIPTION OF THE ACCOMPANYING DRAWINGS

The drawings illustrated here are for providing further understanding of the present disclosure and thus constitute part of the present application. The exemplary embodiments of the present disclosure and depictions thereof are for interpreting the present disclosure, not constituting improper limitations of the present disclosure. In the drawings.

Figure 1:
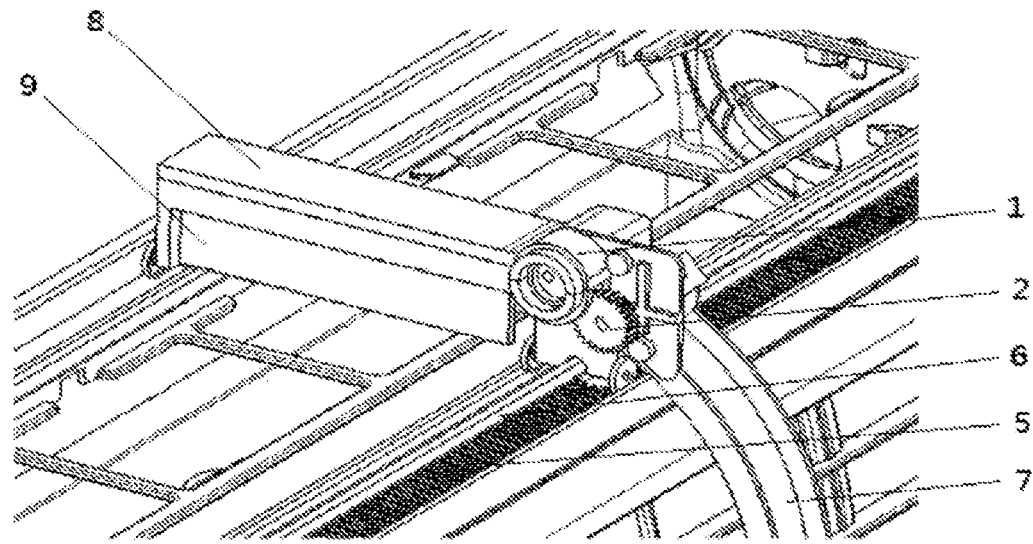
FIG. 1 is a schematic diagram of a structure of an embodiment of a cleaning mechanism according to the present disclosure.

In the drawings: 1—driven gear, 2—drive gear, 3—electric machine, 4—helical gear, 5—helical rack, 6—rotary shaft, 7—bracket, 8—dust suction chamber, 801—a first chamber, 802—a second chamber, 803—a first outlet, 804—a second outlet, 9—brush, 10—air duct, 11—dust suction port.

DETAILED DESCRIPTION OF THE PREFERRED EMBODIMENTS

Next, the technical solution in the embodiments will be explicitly and completely described in combination with the drawings in the embodiments of the present disclosure. Apparently, the described embodiments are merely part of the embodiments of the present disclosure, rather than all the embodiments. On the basis of the embodiments of the present disclosure, all the other embodiments acquired by a person skilled in the art without involving any inventive effort fall into the protection scope of the present disclosure. In the description of the present disclosure, it shall be appreciated that, the azimuth or positional relations indicated by the terms "center", "transverse", "longitudinal", "front", "rear", "left", "right", "upper", "lower", "vertical", "horizontal", "top", "bottom", "within", "outside", which are based on the drawings, are only for facilitating description of the present disclosure and simplifying the description, rather than indicating or implying that the device or element referred to has to present a particular azimuth, and be constructed and operated in a particular azimuth, so that it cannot be understood as limiting the protection scope of the present disclosure.

Figure 4:
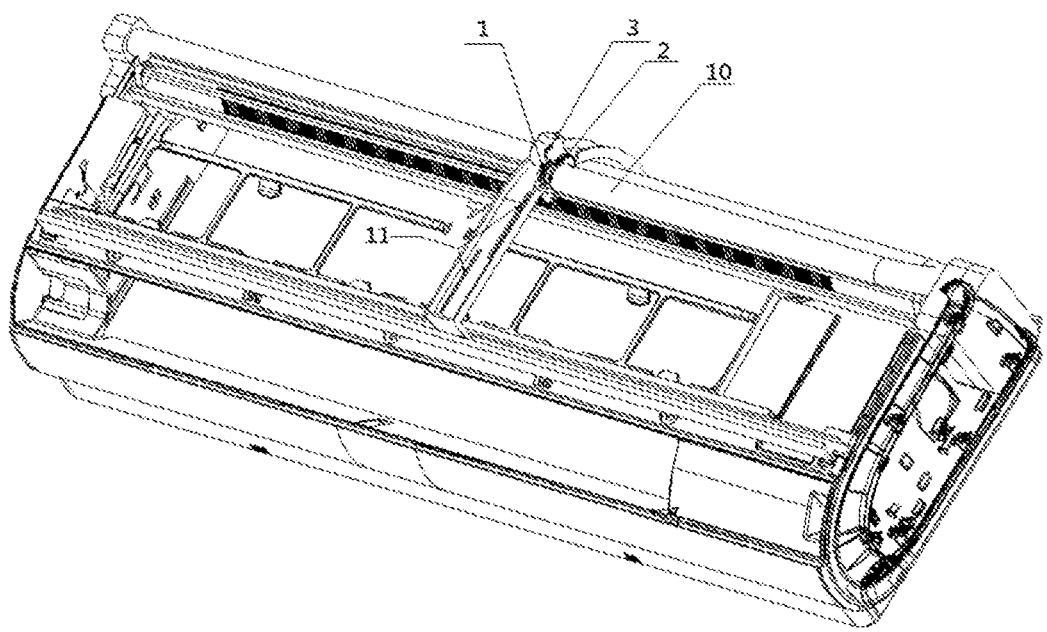
FIG. 4 is a graphic model of a structure of an embodiment of an air conditioner according to the present disclosure.

FIG. 1 is a schematic structural view of the cleaning mechanism in an embodiment of the present disclosure. Referring to FIG. 4, said cleaning mechanism for removing dust of an object to be cleaned, comprises a dust suction member and a switch member, wherein the dust suction member is movable in a reciprocating manner with respect to a surface to be cleaned of the object, and the dust suction member is provided with at least two separate dust suction chambers 8, each dust suction chamber 8 has a dust suction port 11; in an extension direction of the dust suction chamber 8, a projection length of the dust suction port 11 on the surface to be cleaned is smaller than the length of the surface to be cleaned; each of the dust suction chambers 8 for communicating with a fan; and the switch member is selectively communicate the fan with one of the dust suction chambers 8; wherein the extension direction of the dust suction chambers 8 is the length direction of the dust suction chambers 8.

In the aforementioned embodiment, by arrangement of the dust suction member and the switch member, in which the dust suction member is provided with at least two separate dust suction chambers, the cleaning mechanism can switch communication between the fan and different dust suction chambers by said switch member, and in the extension direction of the dust suction chambers, the projection length of the dust suction ports in the dust suction chambers on the surface to be cleaned is smaller than the length of the surface to be cleaned, a cleaning process of the cleaning mechanism for the surface to be cleaned can be performed by regions, and an area of the dust suction ports working in the same period is reduced, thereby achieving a better dust removal effect in case of the same fan power.

In particular, as the switch member can make the fan correspond to different dust suction chambers, in which dust suction ports 11 corresponding to different positions of the surface to be cleaned may be provided, so the switch member enables the cleaning mechanism to perform segmented or regional cleaning to the surface to be cleaned; and in the case that the fan for dust suction has a constant power, the smaller the area of the dust suction ports 11, the better the dust suction effect. Therefore, with the adoption of the switch member, the dust suction ports 11 in the dust suction chamber under the working state can be reduced in area, such that the dust suction effect of each dust suction port 11 is better, and accordingly the overall dust suction effect of the cleaning mechanism is improved.

Figure 3:
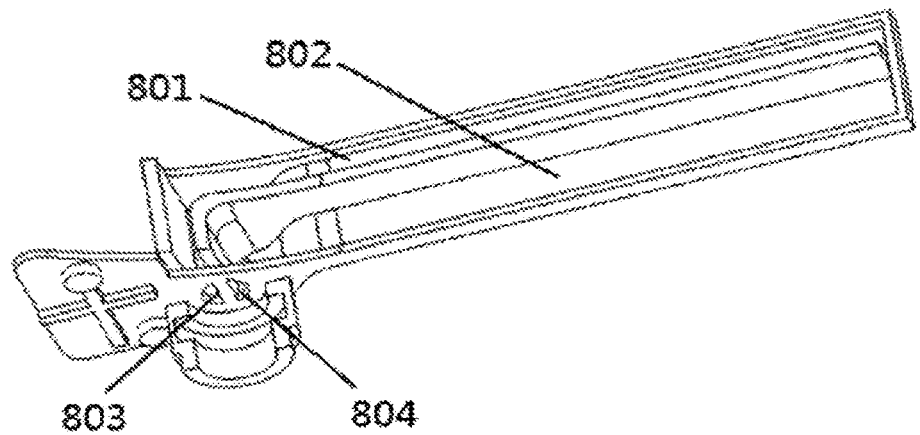
FIG. 3 is a schematic diagram of a structure of an embodiment of a suction chamber according to the present disclosure.

In order to conveniently select the dust suction chamber 8 in communication with the fan during the movement of the dust suction member, the switch member is provided at an outlet of the dust suction chambers 8 between the dust suction chambers 8 and the fan. That is, the switch member is located between the outlet of the dust suction chambers 8 and an inlet of the air duct 10 on an end away from the fan, such that the dust on the surface to be cleaned first comes into the dust suction chambers 8 through the dust suction ports 11, and then comes into the air duct 10 through the switch member, and finally comes into the fan through the air duct 10. In an embodiment, as shown in FIG. 3, the dust suction chambers 8 may comprise a first chamber 801 and a second chamber 802, the first chamber 801 is provided with a first outlet 803, the second chamber 802 is provided with a second outlet 804, and the first outlet 803 or the second outlet 804 is made to communicate with the air duct 10 by the switch member.

The switch member is provided between the outlet of the dust suction chambers 8 and the inlet of the air duct 10 on an end away from the fan, such that the switch member can be moved together with the air duct 10 and the dust suction member, i.e. the dust suction member provides by itself a switch member, which allows the cleaning mechanism to clean the surface to be cleaned by a single air duct, reducing the number of the parts, reducing the interference between the parts and saving the installation space.

In a preferred embodiment, the switch member may be specifically constructed as follows: the switch member comprises a drive unit and a rotation unit, wherein the rotation unit is provided with a through hole and rotates under the driving action of the drive unit, and a circumferential position of the through hole changes with rotation of the rotation unit, so as to selectively communicate the fan with one of the dust suction chambers 8. In other words, rotation of the rotation unit to different positions may allow the through hole to correspond to different dust suction chamber 8, in order to achieve communication with different dust suction chamber 8. As shown in FIG. 3, when the rotation unit rotates to a first position under the driving action of the drive unit, the through hole in the rotation unit communicates with the first outlet 803 on the first chamber 801, and the fan sucks dust through the dust suction port 11 in the first chamber 801; after the regions on the surface to be cleaned corresponding to the dust suction port on the first chamber 801 have been completely cleaned, the rotation unit rotates to a second position, where the through hole in the rotation unit communicates with the second outlet 804 on the second chamber 802, and the fan sucks dust through the dust suction port 11 on the second chamber 802, i.e. cleaning the region on the surface to be cleaned corresponding to the dust suction port on the second chamber 802. Such switch member is simple in structure and easy to implement.

When two or more dust suction chambers 8 are adopted, the cleaning mechanism of the present disclosure can still use only one air duct to realize segmented cleaning of the surface to be cleaned, and it only needs to change the structure of the switch member, with no need to change other structures. For example, the number of through holes in the rotation unit may be changed to meet the corresponding positional relationship between the through holes and the dust suction chambers 8.

Specifically, the drive unit may be an electric machine 3 or a power unit such as a small engine, a motor, an oil cylinder, a gas cylinder, or the like. The rotation unit may be one gear, or two gears in which a driven gear 1 and a drive gear 2 cooperate with each other. In another embodiment, the driven gear 1 may also be a cam. It is preferable to employ a switch member by gear transmission, which has good movement stability and endows the switch member with better dust suction effect.

In another preferred embodiment, the dust suction member may be specifically constructed as follows: as shown in FIG. 1, the dust suction member is configured as a bracket 7 across the surface to be cleaned, the dust suction chamber 8 is provided in the bracket 7, and under driving of the drive mechanism, the bracket 7 performs reciprocating movement by cooperation of rollers arranged at two ends of the bracket 7 and slide rails arranged on both sides of the surface to be cleaned. The bracket 7 spans above the surface to be cleaned, and a height of the bracket 7 above the surface to be cleaned can be determined according to the power of the fan so as to ensure the efficiency of dust suction. The two ends of the bracket 7 are provided with the rollers, which cooperate with the slide rails on the frame of the member to be cleaned and move under the driving action of the drive mechanism.

In the cleaning mechanism as shown in FIG. 1, at least two dust suction chambers 8 are provided; each of the dust suction chambers 8 is provided therein with a dust suction port 11, which mainly acts to make the dust on the surface to the cleaned come into the dust suction chambers through the dust suction port 11, then be sucked into the air duct 10 connected with the fan, and finally be fed into the fan, under the suction action of the fan, to realize cleaning of the surface to be cleaned.

The arrangement of the dust suction port 11 in each of the dust suction chambers 8 may be flexibly selected, so far as it can allow dust to be sucked into the fan through said dust suction port 11. For example, the dust suction port 11 may be arranged in the direction of movement of the dust suction member, that is, the direction of the longer side of the dust suction port 11 is parallel to the direction of movement of the dust suction member. Of course, the direction of the longer side of the dust suction port 11 may also be perpendicular to or at certain angle with the direction of movement of the dust suction member.

Preferably, each of the dust suction ports 11 in the dust suction member is arranged in a direction perpendicular to the direction of movement of the dust suction member. In this way, when cleaning the preset region on the surface to be cleaned, the dust suction ports arranged in a direction perpendicular to the movement direction of the dust suction member have smallest area, thereby saving the power of the fan and achieving good dust suction effect.

The shape of the dust suction ports 11 may also be flexibly selected. The dust suction port 11 is not limited to an elongated rectangular slit, and may also be elliptical, circular, square or otherwise irregularly shaped. The number of the dust suction ports 11 is not limited either, and there may be one or more dust suction ports 11. The dust suction ports 11 may be provided continuously or discretely. For example, the dust suction port 11 may be one elongated rectangular slit or may be a plurality of discrete small round holes. Preferably, the plurality of the discrete small round holes are configured such that their overall length direction is perpendicular to the direction of movement of the dust suction member. In addition, the width of the dust suction port 11 may be determined by the suction power of the fan, and is generally 5 mm or less.

In order to further improve the dust suction effect and comprehensively clean the surface to be cleaned, the dust suction ports 11 overlap each other in the direction perpendicular to the direction of movement of the dust suction member, in order to fully cover the surface to be cleaned during the movement of the dust suction member. That is, all the dust suction ports 11 in all the dust suction chambers 8 can cover the entire surface to be cleaned in the movement process of the dust suction member. As shown in FIG. 4, the dust suction ports 11 may be in staggered arrangement, and the regions on the surface to be cleaned corresponding to the respective dust suction ports 11 overlap to realize comprehensive cleaning free from dead corner.

The specific structure of the dust suction chamber 8 in an embodiment is as shown in FIG. 3. The dust suction chamber 8 may be formed of a plurality of plates. Preferably, a surface of bent portions on the inner wall of the dust suction chambers 8 is configured to be tangent to a flow direction of dust suction air through the bent portion, that is, at all positions bent or spliced in the dust suction chamber 8, the surface is designed to be tangent to a flow direction of dust suction air there through, so as to allow the dust suction air to pass smoothly as much as possible, and to prevent the dust suction air from generating eddy current in the dust suction chamber 8, which can reduce the vibration of the dust suction member, prevent the associated member from damage due to vibration, and reduce the internal noise of the cleaning mechanism at the same time.

Further, a transition surface at a first connection between the switch member and the outlet of the dust suction chamber 8 is configured to be tangent to a flow direction of the dust suction air through the first connection, and a transition surface at a second connection between the switch member and the air duct 10 is configured to be tangent to a flow direction of the dust suction air through the second connection. This is primarily intended to allow the dust suction air to pass the transition portion as smoothly as possible in the process of flowing from the dust suction chamber 8 to the air duct 10 through the switch member, to prevent the dust suction air from generating oscillation in the transition portion thereby to reduce the internal noise of the cleaning mechanism, reduce vibration of the dust suction member, and prevent the associated member from being damaged due to vibration.

In order to further improve the dust removal effect, on a side of the bracket 7 close to the surface to be cleaned is provided a brush 9 for cleaning the dust on the surface to be cleaned. The brush 9 may be arranged on the bottom of the bracket 7 to brush the dust on the member to be cleaned so that the dust can be more easily sucked off the member to be cleaned.

The cleaning mechanism in each of the afore-mentioned embodiments can be applied to different devices, so far as there is a need to clean the surface to be cleaned. For example, it can be applied to tobacco dryers, clothes dryers, or air filters and so on.

Based on the cleaning mechanism as described above, the present disclosure also provides a cleaning device comprising the cleaning mechanism in each of the afore-mentioned embodiments, and a drive mechanism for driving the dust suction member to perform reciprocating movement with respect to the surface to be cleaned.

Figure 2:
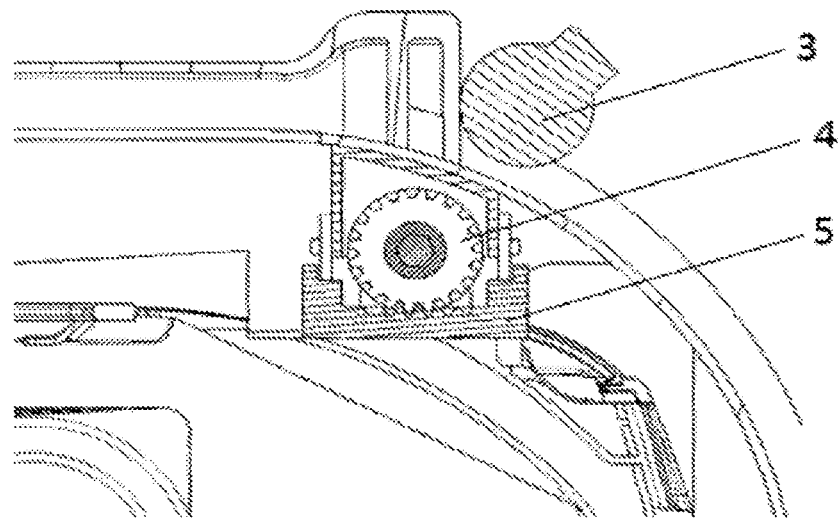
FIG. 2 is a schematic diagram of a structure of an embodiment of a drive mechanism according to the present disclosure.

As shown in FIG. 2, the drive mechanism may comprise a helical gear 4 and a helical rack 5, and the reciprocating movement of the dust suction member with respect to the surface to be cleaned is caused by engagement of the helical gear 4 with the helical rack 5. In particular, the drive mechanism may comprise a power component, a rotary shaft 6 erected at both ends of the member to be cleaned, a helical rack 5 arranged in the axial direction of the rotary shaft 6 and a helical gear 4 fitted over the rotary shaft 6, wherein the power component is located at a side of the member to be cleaned, which is used for driving the rotary shaft 6 to rotate to bring the helical gear 4 into rotation, and rotation of the helical gear 4 is converted into movement of the helical rack 5 in the axial direction of the rotary shaft 6 by engagement of the helical gear 4 with the helical rack 5, such that the dust suction member is driven to move in the axial direction of the rotary shaft 6 by the helical rack 5.

The power component may be an electric machine, an engine or a gear box, or the like. The power component is provided at a side of the member to be cleaned, which can prevent the interference between the power component and the other moving mechanisms, and can provide installation space for other moving components as much as possible. The material of the rotary shaft can be selected as required. In another embodiment, the drive mechanism which drives movement of the dust suction member may also adopt flexible transmission such as nylon rope-and-pulley transmission, belt transmission or other flexible transmission modes, the drive mechanism may also adopt other rigid transmission modes, such as worm-and-gear transmission. The parts for flexible transmission are simple in structure and easy to implement. The rigid transmission modes have high stability. In the embodiment using the helical gear and helical rack for transmission, the helical gear can be made of polyoxymethylene (POM), the helical rack may be made of Polyamide 66(PA66), and both the helical gear and the helical rack are ensured to have a smooth tooth surface. As the helical gear and helical rack have self-lubricating properties, and the mechanism engagement type is linear engagement, there is no need to add lubricating oil in the actual operation process, so that dust cannot retain on the smooth engagement tooth surface with the lubricating oil, and the wear resistance of the tooth surface is greatly improved, thereby ensuring the life service and stability of the transmission mechanism. The helical gear and helical rack have good running stability and high reliability.

Based on the cleaning device as described above, the present disclosure also provides an air conditioner comprising the cleaning device in each of the afore-mentioned embodiments, in which the member to be cleaned is a filter screen of the air conditioner.

Apart from the air conditioner, the cleaning device in each of the afore-mentioned embodiments of the present disclosure can also be applied to other industrial or mechanical devices, e.g. tobacco dryers, clothes dryers, air filters, or the like.

For the air conditioner, the surface to be cleaned comprises a surface of the filter screen provided on two adjacent surfaces of the air conditioner, and the switch member and the drive mechanism are provided on an intersection between the two adjacent surfaces, in order to be able to clean the surface of said filter screen on at least one of said two adjacent faces. That is, the bottom and lateral surfaces of the air conditioner can both be provided with a filter screen, and the above-mentioned automatic cleaning device can simultaneously clean the filter screen on said two surfaces. The bracket 7 spans over the filter screen on two surfaces, the switch member and the inlet of the air duct 10 are located on the intersection between the two surfaces, and dust suction chambers can be provided separately in the bracket over the two surfaces. By such, the drive mechanism can also form support for the switch member and the bracket; and with the addition of the slide rails on the frame of the filter screen, a triangular support is formed, enabling higher mounting stability of the automatic cleaning device, not prone to generating vibration and improving the service life of the device.

The working process of the automatic cleaning device of the present disclosure when applied to an air conditioner will be described with reference to FIGS. 1 to 4 (FIG. 4 is a perspective structural view of the air conditioner with the filter screen being removed).

The automatic cleaning device comprises a bracket 7 provided therein with two dust suction chambers 8, i.e. a first chamber 801 and a second chamber 802, the first chamber 801 is provided with a first outlet 803, the second chamber 802 is provided with a second outlet 804; and a switch member is arranged between the outlet of the dust suction chambers 8 and an inlet of the air duct 10 on an end away from the fan, in which the driven gear 1 is provided with a through hole. When the drive gear 2 is driven by the electric machine 3 to bring the driven gear 1 into rotation to a first position, the through hole in the driven gear 1 communicates with the first outlet 803, and the dust on the filter screen enters into the first chamber 801 through the dust suction port 11 on the first chamber 801, and then enters into the air duct 10 through the first outlet 803 and the through hole and is finally carried away by the fan. When the automatic cleaning device moves from one side to the other side of the filter screen, in order to have the dust on the filter screen at positions corresponding to the dust suction ports in the first chamber 801 completely cleaned off, the bracket 7 may be returned to the initial movement position, or may not be returned to the initial movement position and directly comes to a switch process, in which process the drive gear 2 is driven by the electric machine 3 to bring the driven gear 1 into rotation to a second position; and at this moment, the through hole in the driven gear 1 communicates with the second outlet 804, and the dust on the filter screen enters into the second chamber 802 through the dust suction port 11 in the second chamber 802, and then enters into the air duct 10 through the second outlet 804 and the through hole and is finally carried away by the fan.

In this process, under the driving action of the gear box at a side of the filter screen, the rotary shaft 6 mounted on the frame of the filter screen rotates, which may bring the helical gear 4 fitted over the rotary shaft 6 into rotation; and as the helical gear 4 engages with the helical rack 5, the helical rack 5 moves axially along the rotary shaft 6, and meanwhile drives the bracket 7 to move axially along the rotary shaft 6, such that the end of the air duct 10 away from the fan also moves axially along the rotary shaft 6 with the bracket 7, so that the dust at different positions of the filter screen can be carried away by the fan. The brush 9 provided on the bottom of the bracket 7 can make the dust more easily sucked away by the fan.

As shown in FIG. 4, the fan and the gear box for rotating the rotary shaft 6 to rotate are both omitted here and are not shown in the drawing. The fan may be arranged at the end of the air duct 10, i.e. at the left end of the frame of the filter screen as shown in FIG. 4, while the gear box may be arranged at a side opposite to the fan so as to provide both of them with a greater installation space.

It will be appreciated that the cleaning mechanism, the cleaning device and the air conditioner in embodiments of the present disclosure have at least one or more of the following advantages by explaining the embodiments of the cleaning mechanism, the cleaning device and the air conditioner of the present disclosure:

1. The adoption of the switch member allows the cleaning process to be performed by segments, reducing the area of the dust suction ports in working state, and thereby improving the dust suction effect;

2. The switch member adopts gear transmission, thus being simple in structure and capable of switching more stably and reliably;

3. The drive mechanism realizes transmission by the helical gear and helical rack, which have simple structure, have no need for lubricating oil, and accordingly can prevent dust from remaining on the smooth engagement tooth surface with the lubricating oil, greatly improving the abrasion resistance of the engagement tooth surface, and ensuring the service life and stability of the transmission mechanism. The helical gear and helical rack have high running stability and reliability.

Finally, it should be explained that the aforementioned embodiments are only used to describe the technical solution of the present disclosure rather than limiting the same; although detailed explanations are made to the present disclosure by referring to preferred embodiments, a common technical person in the art should understand that: it is still possible to make amendments to the embodiments of the present disclosure or make equivalent replacements to part of the technical features; without departing from the spirit and scope of the present disclosure, they should all be covered in the scope of the technical solution for which protection is sought in the present disclosure.

The invention claimed is:

1. An air conditioner, comprising a filter screen and a cleaning mechanism for removing dust from the filter screen, wherein the cleaning mechanism comprises:
   a fan;
   a dust suction member; and
   a switch member,
   wherein the dust suction member is movable in a reciprocating manner with respect to a surface to be cleaned of the filter screen, and the dust suction member is provided with at least two separate dust suction chambers, each dust suction chamber having a dust suction port respectively; in an extension direction of the dust suction chamber, a projection length of the dust suction port on the surface to be cleaned is smaller than the width of the surface to be cleaned; each of the dust suction chambers is configured to communicate with the fan, and the switch member selectively communicates the fan with one of the dust suction chambers;
   wherein the switch member is provided at an outlet of the dust suction chambers between the dust suction chambers and the fan, and the switch member comprises a drive unit and a rotation unit, wherein the rotation unit is provided with a through hole and rotates under a driving action of the drive unit, and a circumferential position of the through hole changes with rotation of the rotation unit to allow the through hole to achieve communication with the outlet of different dust suction chambers, so as to selectively communicate the fan with one of the dust suction chambers.

2. The air conditioner according to claim 1, wherein the dust suction member is configured as a bracket across the surface to be cleaned, the dust suction chambers are provided in the bracket, and the bracket performs reciprocating movement by cooperation of rollers arranged at two ends of the bracket and slide rails arranged on both sides of the surface to be cleaned.

3. The air conditioner according to claim 1, wherein the dust suction ports on the dust suction member are arranged in a direction perpendicular to the direction of movement of the dust suction member.

4. The air conditioner according to claim 3, wherein in the direction perpendicular to the direction of movement of the dust suction member, the dust suction ports overlap each other, so as to fully cover the surface to be cleaned during the movement of the dust suction member.

5. The air conditioner according to claim 1, wherein a surface of bent portions on an inner wall of the dust suction chambers is configured to be tangent to a flow direction of dust suction air through the bent portions.

6. The air conditioner according to claim 1, wherein a transition surface at a first connection between the switch member and the outlet of the dust suction chambers is configured to be tangent to a flow direction of dust suction air through the first connection, and a transition surface at a second connection between the switch member and the fan is configured to be tangent to a flow direction of dust suction air through the second connection.

7. The air conditioner according to claim 2, wherein on a side of the bracket adjacent to the surface to be cleaned is provided with a brush for cleaning dust on the surface to be cleaned.

8. The air conditioner according to claim 1, further comprising a drive mechanism, the drive mechanism configured to drive the dust suction member to perform reciprocating movement with respect to the surface to be cleaned.

9. The air conditioner according to claim 8, wherein the drive mechanism comprises a helical gear and a helical rack, and the reciprocating movement of the dust suction member with respect to the surface to be cleaned is caused by engagement of the helical gear and the helical rack.

10. The air conditioner according to claim 1, wherein the surface to be cleaned comprises a surface of the filter screen arranged on two adjacent surfaces of the air conditioner, and the switch member and a drive mechanism are provided on an intersection between the two adjacent surfaces, so as to clean the surface of said filter screen on at least one of said two adjacent surfaces.

* * * * *